Nov. 9, 1965 W. E. PALMER ETAL 3,216,055
APPARATUS FOR SEPARATING AND CLOSING WEASANDS
Filed April 9, 1963 3 Sheets-Sheet 1

INVENTORS.
WILLIAM E. PALMER
BY LLOYD WEAVER
ATTORNEY.

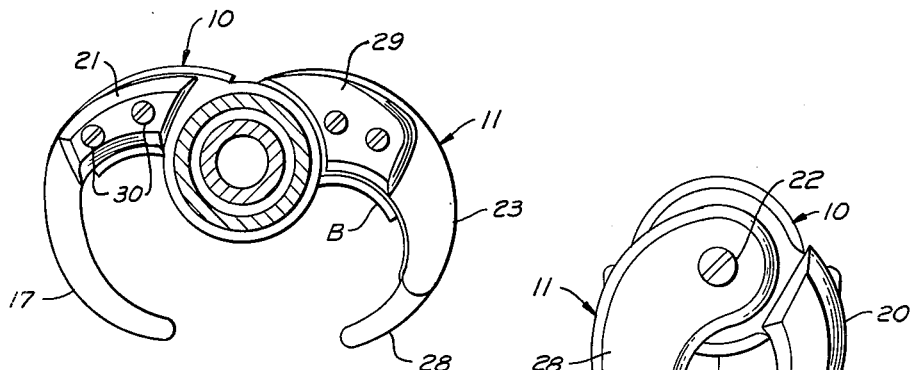
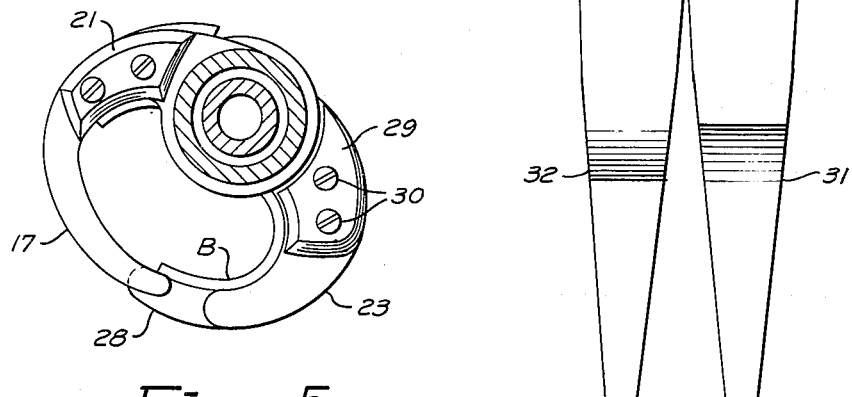
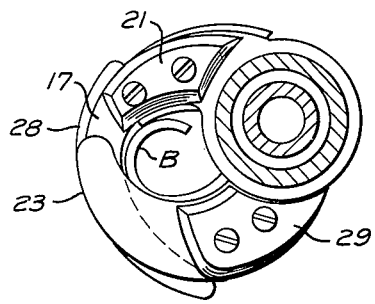

Nov. 9, 1965  W. E. PALMER ETAL  3,216,055
APPARATUS FOR SEPARATING AND CLOSING WEASANDS
Filed April 9, 1963  3 Sheets-Sheet 3

WILLIAM E. PALMER
LLOYD WEAVER
INVENTORS.

BY *R.G. Story*
ATTORNEY.

United States Patent Office 3,216,055
Patented Nov. 9, 1965

3,216,055
APPARATUS FOR SEPARATING AND CLOSING WEASANDS
William E. Palmer, Downers Grove, Ill., and Lloyd D. Weaver, Sioux City, Iowa, assignors to Swift & Company, Chicago, Ill., a corporation of Illinois
Filed Apr. 9, 1963, Ser. No. 271,725
5 Claims. (Cl. 17—1)

The present invention relates to an apparatus useful in the evisceration of butchered animals; and more specifically comprises an improved apparatus for separating the weasand, or esophagus, of a slaughtered animal from neck tissues, and closing off the weasand at a point closely adjacent the stomach.

In the packinghouse industry the term "weasand" is currently used to identify that portion of the alimentary canal of a bovine animal extending between pharynx and stomach, more properly known as the esophagus. In a narrower sense, within the same industry, the term "weasand" is specific to the mucous lining of the esophagus, which lining may be used as a natural casing for sausage or the like. However, the term is here used in the broader sense to identify the esophagus tube.

The weasand is a valuable part of an animal from which natural casing material may be recovered (the inner mucous lining thereof) and also provides recoverable edible meat (the outer muscular fibers). The weasand contains a potential source of contamination to the remainder of the animal carcass since it is connected directly to the stomach organ which usually contains partially digested animal food. Accordingly, it is both necessary and economical to remove the weasand along with the stomach in one piece and without rupture during evisceration of the animal.

In the past this operation has been accomplished by knotting the severed throat end of the wesaid and then forcing a ring-like member (on the end of a long rod) about the weasand through the neck of the slaughtered animal to the abdominal diaphragm. These steps close the severed end of the weasand and separate it from the neck tissue including the trachea. Thereafter the ring is withdrawn and the stomach, weasand, and other viscera, are removed together through an abdominal incision. The viscera is thence transferred to an inspection table or the like whereafter the weasand is tied off with a cord at a point near the stomach. Subsequently portions of the viscera, including the weasand, are removed and further processed.

However, the weasand is a portion of the viscera that is subject to rupture. If rupture occurs before it is removed from the animal carcass, the contents of the stomach, or paunch, will contaminate the flesh of the animal. The result is loss to the packer, due to contamination and also damage to recoverable casing material. Often the removal of the viscera is undertaken when the cattle is hanging neck downward. In this posture the fluid pressure of the somach contents is exerted throughout the weasand and thus increases the likelihood of its rupture.

Accordingly, it is the principal object of this invention to provide an improved apparatus for separating the weasand from the neck tissue.

It is another object of this invention to provide an improved apparatus for closing off the weasand at a point adjacent the stomach before the latter is removed from the animal carcass.

It is a further object of this invention to provide an improved apparatus for separating the weasand from the neck tissue and closing off the weasand at a point adjacent to the stomach before the latter is removed from the animal carcass.

It is still another object of the present invention to provide an improved apparatus for separating the weasand of a slaughtered animal from the neck tissue and closing off the weasand at a point closely adjacent the animal stomach.

Basically the present method involves the sliding of an encirclement along the length of the weasand, whereby to sever all connective tissue between the esophagus and neck of the animal, closing off the weasand at a point close to the animal stomach, and subsequently removing the stomach and weasand through an abdominal incision in the animal carcass.

A novel apparatus devised for separating the weasand and closing it comprises a pair of arcuately shaped interdigitating jaws mounted upon an end of an operating arm and movable between three positions wherein the jaws are held in open, encircling, and compressing positions, respectively. A deformable band is positionable between the jaws when opened, and bendable to form a partial circle when the jaws are moved to the encircling position. The jaws are preferably of a configuration which will smoothly sever connective tissue when placed about and forced along the length of a weasand. Thereafter the jaws may be closed to the third or compressing position to fully bend, or overlap, and crimp a band about the weasand.

Further objects and advantages of the present invention will become apparent in the course of the following description when taken in conjunction with the drawings wherein:

FIGURE 3 is a front end elevation of the apparatus of FIGURE 2;

FIGURES 4, 5 and 6 are rear views, partially in section, showing the jaw members in the open, encircling, and compressing positions, respectively;

The method of the present invention is carried out upon an animal carcass after the animal has been slaughtered and its neck severed. An operator grips the severed end of the animal's esophagus, or weasand, through a cut in the neck, knots the severed end, and pulls it taut. The weasand is then stripped and separated from connective tissues within the neck, and closed off at a point adjacent the animal stomach. In the preferred practice of the method the tool shown in the figures, containing a partially deformed band B, is utilized to perform both of the latter steps, by adjusting it to the encircling position, as shown in FIGURE 5, and passing it over the knotted end of the weasand and into the neck until the jaws thereof reach about the abdominal diaphragm. However, it is to be understood that the above steps may be completed with separate instruments.

The jaws of the device, in the position indicated, thus completely encircle the weasand, and sever all connective tissue thereabout within the neck as they are moved longitudinally of that member. Upon reaching the diaphragm the operator moves the jaws of the device to the third, or compressing, position to fully deform the band, held therein, so as to tightly encircle and crimp closed the weasand close to the animal stomach. Thereafter the jaws of the device are returned to the encircling position and the tool is removed in the reverse direction along the weasand.

After the weasand has been closed off, the weasand and stomach are removed together, along with the remainder of the visceral organs, through the usual incision made in the abdominal area of the animal.

Figure 1:
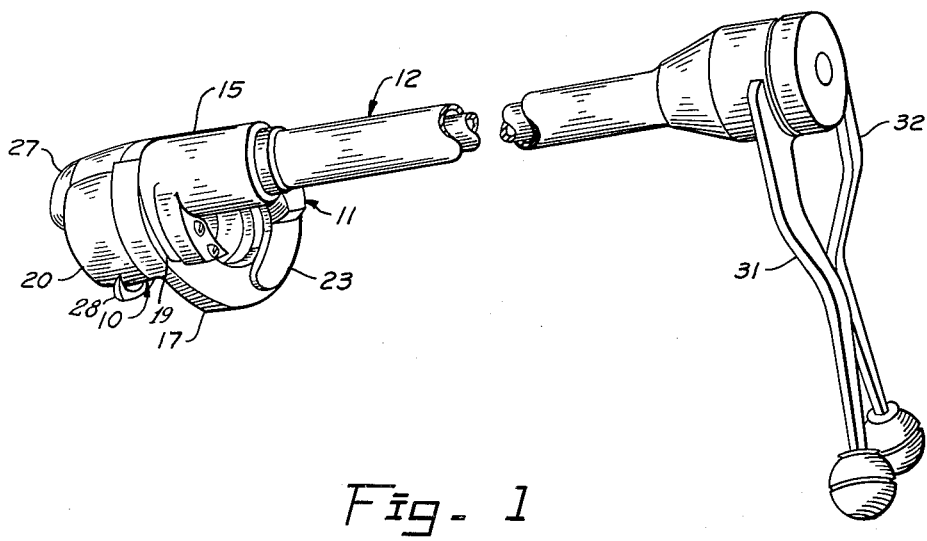
FIGURE 1 is a perspective view of the apparatus of the present invention.
Figure 2:
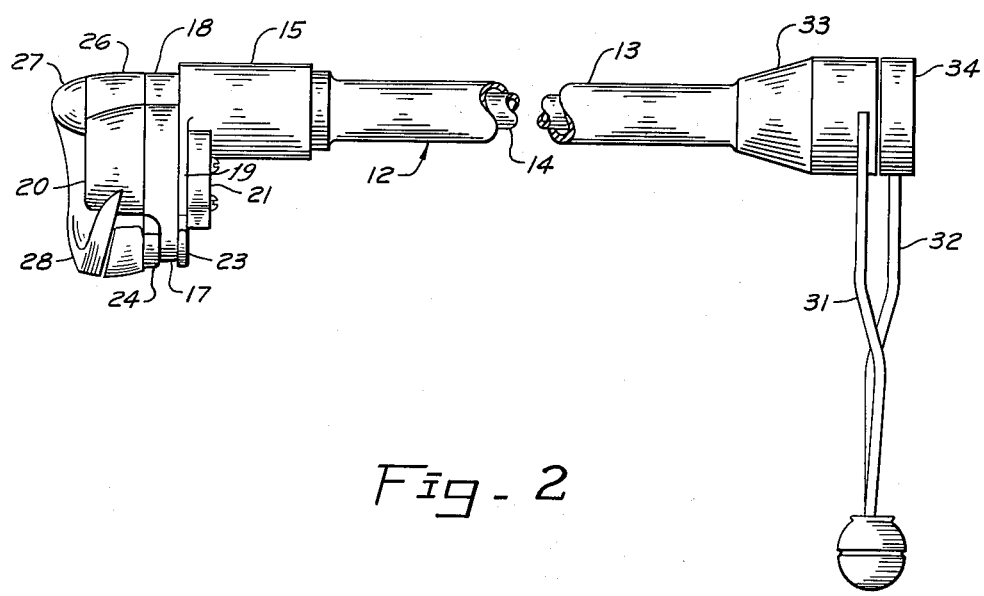
FIGURE 2 is a side elevation of the apparatus of FIGURE 1.
Figures 7, 8:
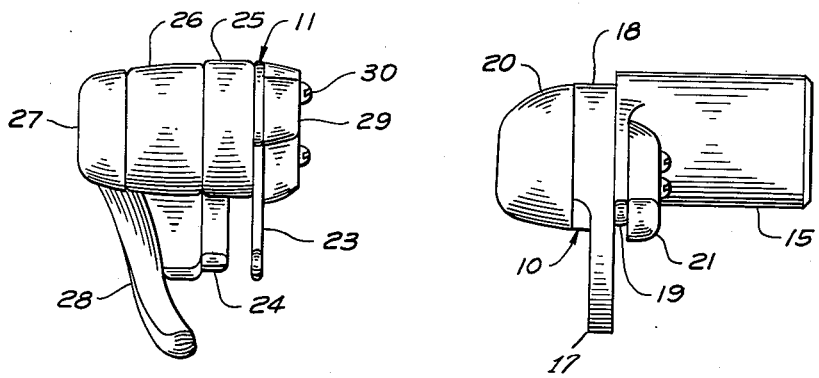
FIGURE 7 is a side view of one jaw member of the apparatus.
FIGURE 8 is a side view of the other jaw member of the apparatus.

The preferred tool device used in performing the foregoing method is shown in FIGURES 1–8, and comprises a pair of movable jaws generally 10 and 11 which are fastened to one end of a lengthy operating means comprising an arm generally 12. Referring to FIGURES 1 and 2, it will be seen that the operating arm 12 consists of two concentric shaft members, namely an outer tube 13 and an inner rod 14. One crimping jaw 10 is mounted by a sleeve 15 upon the outer tube 13, whereas the other crimping jaw 11 is fastened to the end of the inner rod 14. Thus the jaw 10 is relatively fixed and stationary with respect to the operating arm generally 12, while jaw 11 is movable with respect thereto; and interdigitating portions of the jaws may be brought together about a band B and a weasand.

The jaw members thus constitute a means to encircle a weasand, and additionally the inner surface of the interdigitating portions thereof serve as a means to compress and close off a weasand when moved to the compressing position. These members are of novel interdigitating form to engage the deformable band B and assume the aforementioned three operating positions; and also to pass about the weasand member without danger of rupturing or tearing the same. Both jaws may be described as having streamlined means at the forward ends to smoothly separate the weasand from connective tissue, and are rounded on the rear ends to avoid damage to the weasand when removing the instrument.

Jaw 10 is relatively fixed on a sleeve 15, and comprises a main arcuate member 17 extending from a ring-shaped body 18. The arcuate member 17 and ring 18 have a flat continuous rear surface postioned against the end of sleeve 15 and a flange 19 extending radially from the latter. The ring is held substantially concentric with the sleeve 15. The ring and the immediately adjacent position of member 17 secured to the flange 19 are relatively broad, and bear a thick cap 20 on the forward side of the arcuate member while the end of member 17, beyond the flange 19, is of reduced thickness, preferably about 3/16-inch thick. A shallow cap 21 is positioned on the rear side of the flange 19.

The movable jaw 11, adapted to be secured to the end of rod 14 by a screw 22, comprises a pair of similar arcuate members 23, 24 curved oppositely to member 17. Viewing the jaw in FIGURE 7, it will be seen that the rear-most arcuate member 23 is relatively thin, being of slightly less thickness than flange 19. The forward arcuate member 24 is of approximately equal thickness to the end of member 17 and similarly extends from a thicker body 25. At the flat forward side of the body 25, and arcuate member 24, a tapered spacer 26 is positioned covering the full length of the arcuate member. Fully forward of the spacer 26 is a cap 27 having a smooth helical guard 28 extending along the spacer 26, and beyond, to approximately the plane of the forward side of the arcuate member 24.

A rear cap 29 is located on the rear surface of the arcuate member 23 of jaw 11. All of the foregoing parts of the respective jaws 10 and 11 are fastened together by a pair of countersunk screws 30 in each jaw.

It will be noted that the arcuate members of both jaws are mounted perpendicular to the axis of the operative arm generally 12 and are positioned so that the member 17 interdigitates with members 23 and 24. The deformable band B is held between those members. Both forward caps 20 and 27 (including guard 28), on jaws 10 and 11 respectively, taper smoothly to a rounded crown forward of the tool and cooperate to present a smooth forward surface for the jaws which serves as a means to sever connective tissue when the apparatus is in the encircling position.

The jaws generally 10 and 11 are operated through the three aforementioned positions by a pair of handles 31, 32. Handle 31 is fastened to the far end of the outer tube 13; the handle 32 is similarly secured to the far end of the inner rod 14. The end of the tube 13 is expanded in the form of a collar 33 to which the handle 31 is secured. The end of the inner rod 14 is in the form of a plug 34 which is rotatable with respect to the collar 33 and is secured to the handle 32. As may be seen in FIGURE 2 the two handles 31, 32 are appropriately bent so that their respective grips reside in about the same plane. Preferably the handles are secured to the apparatus so as to be closely adjacent one another when the jaws 10 and 11 are in the compressing or crimping position. To open the jaws to either of the other two positions it is simply necessary for an operator to manually separate the handles 31, 32.

To operate the device a band B is pressed across the arcuate members 17, 23 and 24 when the jaws are open as shown in FIGURE 4. Preferably the band is partially preformed in an arcuate or U shape to fit between the open jaws. The handles 31, 32 are then moved toward one another until the jaws form an encirclement, as shown in FIGURE 5, partially bending the band B. A weasand is then inserted through the encirclement, in the direction of arm 12; and the device is pushed along the length of the weasand. Thereafter the handles 31, 32 are brought together to compress the jaws and crimp the band B, as in FIGURES 3 and 6, tightly about the weasand. Subsequently the handles are separated partially and the device is withdrawn.

Figure 9:
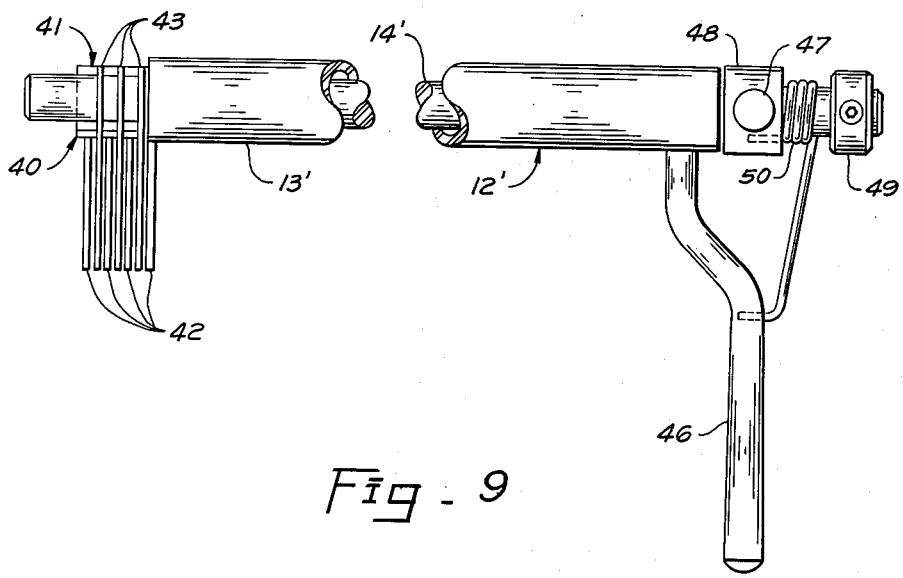
FIGURE 9 is a side elevation of a second embodiment of the apparatus of this invention.

A second embodiment of the apparatus is illustrated in FIGURE 9 wherein parts similar to those described for the preferred embodiment bear the same reference characters with a prime exponent. The second embodiment includes a pair of crimping jaws generally 40, 41 which are in the form of a plurality of interdigitating leaves. In the specific instrument illustrated the stationary jaw 40 mounted upon the outer tube 13' consists of four arcuate leaves 42. The movable jaw 41, which is fastened to the inner rod 14', consists of three spaced arcuate leaves 43 which may be swung, upon the rod, into the spaces between the leaves 42 on jaw 40.

Also in the second embodiment a slightly different form of actuating mechanism is illustrated. In this embodiment one handle 46, which is formed from bent rod stock, is fastened directly to the end of the outer tube 13'. A second handle 47 is fastened to a collar 48 which is in turn secured to the inner rod 14' adjacent the end of the outer tube 13'. However, the inner rod 14' extends slightly beyond the collar 48, and spaced slightly from the latter is a lock ring 49. Mounted between the collar 48 and lock ring 49 is a helical torsion spring 50, the ends of which are connected to the handles 46, 47.

In this embodiment, the handles 46, 47 are positioned at about 90° from one another when the jaws 40, 41 are in the second or encircling position. Thus to move the jaws to either of the fully open or compressing (crimping) positions, it is necessary for the operator to move the handles either apart or toward one another against the force of the torsion spring 50. One advantage of this form is the built-in bias of the device to assume the encircling position.

Obviously many modifications and variations of the invention as hereinbefore set forth may be made without departing from the spirit and scope thereof, and therefore only such limitations should be imposed as are indicated in the appended claims.

We claim:

1. An improved apparatus for separating a weasand from the neck of an animal carcass, said apparatus comprising: weasand encircling means movable between open, encircling, and compressing positions with respect to said weasand; severing means forming a part of said encircling means for separating a weasand from connective tissue within the neck of an animal; compressing means forming a part of said encircling means for pressing a deformable band about a weasand to close off the latter; and operating means connected to said encircling means for forcing the same along the length of said weasand and moving the compressing means to close off a weasand.

2. An improved apparatus for separating a weasand from the neck of an animal carcass and closing off the weasand adjacent the stomach, said apparatus comprising: a pair of cooperating jaw means, said jaw means being movable from an open position to form an encirclement about a weasand and also movable to compress said weasand; severing means mounted on a forward end of said jaw means for separating a weasand, encircled thereby, from connective tissue within the neck of an animal; compressing means on said jaws to press a deformable band about a weasand so as to close off the latter; and operating means connected to said jaws for forcing the same along the length of said weasand and for moving said compressing means to close off a weasand.

3. An improved apparatus for separating a weasand from the neck of an animal carcass and closing off the weasand adjacent the stomach, said apparatus comprising: a pair of interdigitating jaws, said jaws being movable between open, encircling, and compressing positions; streamlined means on a forward end of said jaws cooperable to sever connective tissue about a weasand when said jaws are in said encircling position thereabout; arcuate members on said jaws for holding a deformable band and for bending said band to compress and close off same when said jaws are in the compressing position; and an operating means attached to a rear end of said jaws for moving said jaws between said positions and for forcing the jaws along the length of a weasand through the neck of an animal carcass.

4. An improved apparatus for separating a weasand from the neck of an animal carcass and closing off the weasand adjacent the stomach, said apparatus comprising: a first shaft; a second shaft concentric to said first shaft; arcuate interdigitating jaw members secured to one end of said first and second shafts, said jaw members being movable by said shafts through open, encircling, and compressing positions with respect to a weasand, said jaw members also being adapted to hold a deformable band therebetween; arcuate streamlined caps at the forward ends of said jaws, opposite said shafts, to sever connective tissue about a weasand; and handle means secured to ends opposite said one end of said first and second shafts whereby said jaws may be moved through said aforementioned positions to encircle a weasand and be moved along the length thereof to sever the same from the neck, and to subsequently compress said jaws and to close off the weasand with said deformable band.

5. An improved apparatus for separating a weasand from the neck of an animal carcass and closing off the weasand adjacent the stomach, said apparatus comprising: a first shaft; a second shaft concentric to said first shaft; arcuate interdigitating jaw members secured to one end of said first and second shafts, said jaw members being movable by said shafts through open, encircling, and compressing positions with respect to a weasand, said jaw members also being adapted to hold a deformable band therebetween; handle means secured to ends opposite said one end of said first and second shafts whereby said jaws may be moved through said aforementioned positions to encircle a weasand and be moved along the length thereof to sever the same from the neck, and to subsequently compress said jaws and to close off the weasand with said deformable band; and means connected to said handle means to urge said jaws to one of said positions.

References Cited by the Examiner
UNITED STATES PATENTS

| | | | |
|---|---|---|---|
| 818,869 | 4/06 | Calvert | 81—346 X |
| 2,108,921 | 2/38 | McKim | 17—45 |
| 2,231,954 | 2/41 | Scherubel | 17—45 |
| 2,505,964 | 5/50 | Hincks | 17—1 |
| 2,706,921 | 4/55 | Paulson | 81—346 |
| 2,968,041 | 1/61 | Skold | 1—187 |
| 3,023,416 | 3/62 | Ytreland | 1—187 |
| 3,099,857 | 8/63 | Milbury et al. | 17—1 |

SAMUEL KOREN, *Primary Examiner.*

LUCIE H. LAUDENSLAGER, *Examiner.*